United States Patent [19]

Marsh

[11] Patent Number: 4,549,434
[45] Date of Patent: Oct. 29, 1985

[54] PRESSURE LEVEL SENSOR

[75] Inventor: Lawrence B. Marsh, Silver Spring, Md.

[73] Assignee: Marsh-McBirney, Inc., Gaithersburg, Md.

[21] Appl. No.: 665,004

[22] Filed: Oct. 26, 1984

[51] Int. Cl.$^4$ .......................... G01F 23/14; G01F 9/00
[52] U.S. Cl. ........................................ 73/299; 73/198; 73/861.12
[58] Field of Search ................. 73/227, 299, 291, 198, 73/861.12

[56] References Cited

U.S. PATENT DOCUMENTS

| | | |
|---|---|---|
| 2,299,077 | 10/1942 | Cole et al. ............................... 73/299 |
| 4,070,563 | 1/1978 | Petroff . |
| 4,116,061 | 9/1978 | Petroff . |
| 4,211,111 | 7/1980 | Petroff . |
| 4,295,197 | 10/1981 | Petroff . |
| 4,344,329 | 8/1982 | Petroff ............................... 73/299 X |
| 4,388,827 | 6/1983 | Palmer et al. .......................... 73/302 |
| 4,389,898 | 6/1983 | Long et al. ......................... 73/861.12 |
| 4,459,858 | 7/1984 | Marsh ............................... 73/861.12 |

Primary Examiner—Charles A. Ruehl
Attorney, Agent, or Firm—Laubscher & Laubscher

[57] ABSTRACT

A pressure level sensor for mounting a pressure transducer in a fluid flow channel. The sensor is characterized by an elongated wedge-shaped configuration wherein the width of the convex front wall portion is less than that of the rear wall portion which in turn is less than the length of the sensor. The side wall portions of the sensor each have concave surfaces, the radius of curvature of which is a function of the length of the sensor. At least one side wall portion contains a horizontal pressure port for communication with the pressure transducer. The front, rear, and side wall portions are tapered and curved vertically inwardly and terminate at a top wall portion. When the sensor is arranged on the bottom of the channel with the front wall portion facing upstream relative to the fluid flow, the velocity vector of the fluid flow is perpendicular to the direction of extension of the opening, thereby to minimize flow velocity effects on the pressure transducer.

12 Claims, 6 Drawing Figures

U.S. Patent  Oct. 29, 1985  Sheet 1 of 2  4,549,434
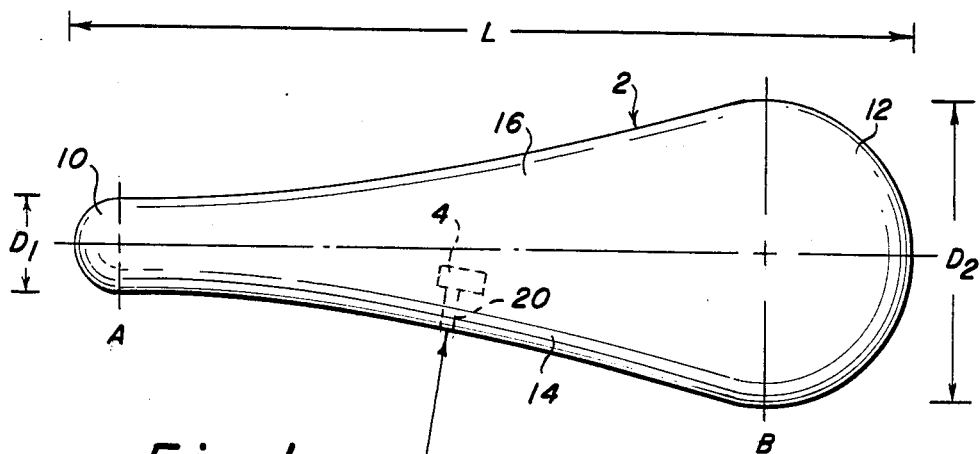
Fig. 1
Fig. 2
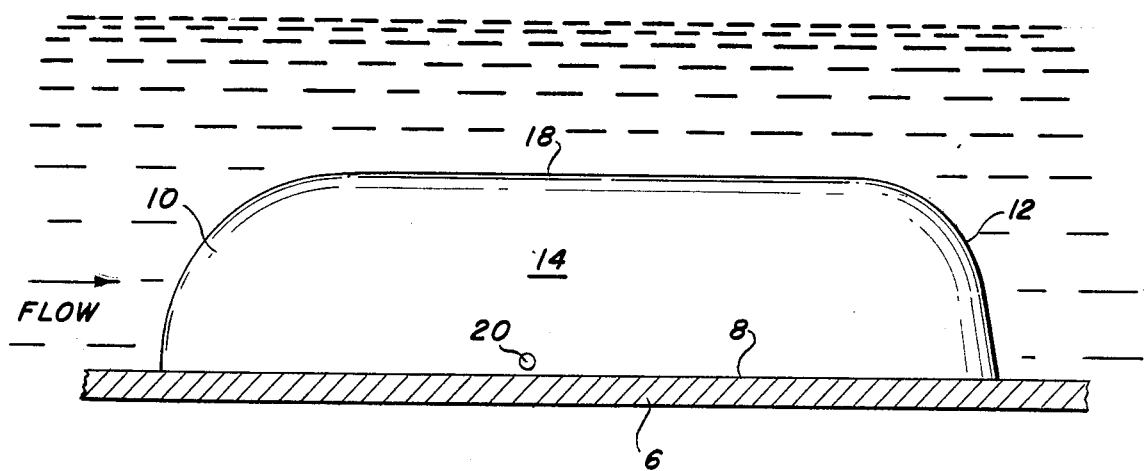

PRESSURE LEVEL SENSOR

BACKGROUND OF THE INVENTION

It is often necessary to measure the level or depth of fluid which is flowing in a channel or conduit. These level measurements are used to control the operation of valves or switches, or used in conjunction with a velocity measurement for the measurement of flow rate within the channel.

The present invention relates to a sensor for mounting a pressure transducer at the bottom of a fluid flow channel for measuring the depth of the fluid. The sensor is uniquely configured in a wedge shape to minimize the velocity effects of the fluid flow on the pressure transducer and to avoid the accumulation of debris thereon.

BRIEF DESCRIPTION OF THE PRIOR ART

It is well-known in the prior art to measure water depth using a submerged pressure transducer that is placed at or near the bottom of a fluid flow channel. Since the density of the fluid (i.e. water) is generally constant, the measurement of fluid head can be performed by the pressure transducer as a function of the relationship between fluid depth and the weight of the fluid per inch of depth. Static head measurements can be performed rather easily and the shape of the transducer for such measurements is of little consequence.

However, where the pressure transducer is submerged in flowing fluid, the placement of the inlet port to the pressure transducer becomes critical since the port is affected by either positive or negative pressures created by the water flowing past the inlet port. These fluctuating pressures adversely affect the pressure measurements of the transducer, thereby diminishing the accuracy of the measurements of fluid level.

Accordingly, it is known in the art to arrange the pressure inlet port perpendicular to the velocity vector of the flowing fluid. In general, the inlet ports of the prior devices are designed so that they extend perpendicularly to the fluid velocity vector. The inlet ports are normally hidden in a long run of channel to eliminate the effects of nearby discontinuities or bulges that would cause instabilities of the velocity vector which produce velocity effects on the measure of fluid level.

In many instances, as evidenced by the U.S. patents to Petroff No. 4,070,563, No. 4,116,061, No. 4,211,111, No. 4,295,197, and No. 4,344,329, the pressure transducer is contained within a sensor adapted for insertion into and removal from a channel. Such sensors have a streamlined housing to reduce their resistance to flow.

While the prior devices normally operate satisfactorily, they are still sensitive to velocity effects of the fluid since the sensor itself comprises a discontinuity in the channel. The present invention was developed to overcome these and other drawbacks of the prior devices by providing an improved pressure level sensor configured such that the input port to the pressure transducer is positioned perpendicular to the velocity vector of the flowing fluid and remains so over a wide range of velocities.

SUMMARY OF THE INVENTION

Accordingly, it is a primary object of the present invention to provide a wedge-shaped sensor member for mounting a pressure transducer in a fluid flow channel to measure the depth of the fluid. The sensor member includes a generally planar bottom wall adapted for placement on the bottom of the channel, and front and rear wall portions connected with the bottom wall. The front wall portion has a horizontally convex surface configuration and a width less than the width of the rear wall portion, and the rear wall portion has a width less than the length of the sensor. A pair of side wall portions are arranged between the front and rear wall portions, each having a horizontally concave surface configuration, the radius of curvature of which is a function of the length of the sensor. A top wall portion is arranged between the front, rear, and side wall portions. At least one of the side wall portions contains a horizontal opening or port adjacent the bottom wall and extending normal to the side wall surface for communication with the interiorly mounted pressure transducer. When the sensor is arranged on the bottom of a channel with the front wall portion facing the upstream direction of fluid flow, the velocity vector of the fluid flow is perpendicular to the direction of extension of the opening to minimize flow velocity effects on the pressure transducer.

According to a further object of the invention, the radius of curvature of the side wall surfaces is between three and five times the length of the sensor member, and the width of the rear wall portion is between two and six times the width of the front wall portion.

It is another object of the invention to taper the front, rear, and side walls of the sensor inwardly in the direction from the bottom wall toward the top wall portion to provide the sensor with a curved streamlined configuration in order to prevent the accumulation of debris thereon.

It is yet another object of the invention to provide an electromagnet within the sensor for generating within the fluid an electromagnetic field, the axis of which extends normal to the direction of fluid flow and a pair of electrodes mounted in the top wall portion for producing electrical signals in response to the flow of fluid through the electromagnetic field, the electrical signals being a function of the velocity of the fluid flow.

According to a more specific object of the invention, the top wall portion of the sensor containing the electrodes for producing flow velocity signals is arranged at an angle of between 2° and 10° relative to the bottom wall with the height of the sensor increasing from the front wall toward the rear wall.

BRIEF DESCRIPTION OF THE FIGURES

Other objects and advantages of the subject invention will become apparent from a study of the following specification when viewed in the light of the accompanying drawing, in which:

FIG. 1 is a top plan view of a first embodiment of a pressure level sensor according to the invention;

FIG. 2 is a side plan view of the sensor of FIG. 1 submerged in a channel;

DETAILED DESCRIPTION

Figure 3:
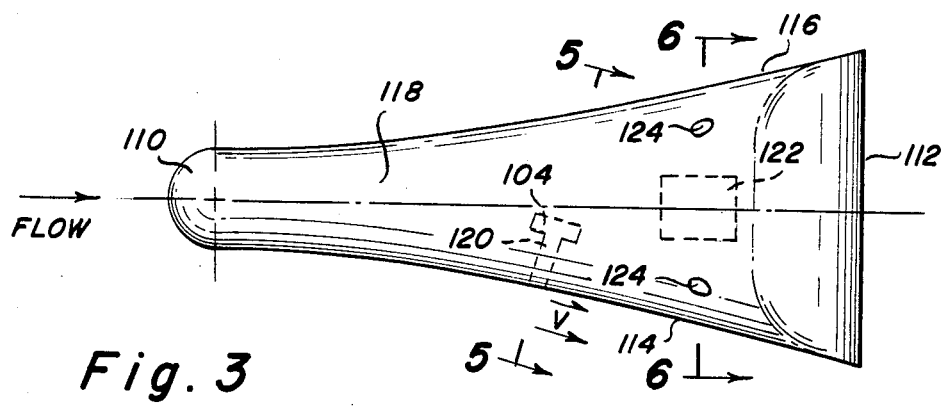
FIG. 3 is a top plan view of an alternate embodiment of a pressure level sensor according to the invention.

As shown in FIGS. 1 and 2, the present invention relates to an elongated, wedge-shaped sensor member 2 for mounting a pressure transducer 4 in a fluid flow channel or conduit 6 to measure the depth of a fluid such as water within the channel. The sensor member includes a generally planar bottom wall 8 adapted for placement on the bottom of the channel to submerge the sensor in the fluid. Front 10 and rear 12 wall portions are connected with and extend upwardly from the bottom wall. As shown in FIG. 1, the front wall portion 10 has a horizontally convex surface configuration and a width $D_1$ less than the width $D_2$ of the rear wall portion. Moreover, the width $D_2$ of the rear wall portion is less than the length L of the sensor.

As noted above, the sensor 2 has an elongated wedge-shaped configuration, owing to the relationship between the widths of the front 10 and rear 12 wall portions of the sensor to the total length thereof. Preferably, the width $D_2$ of the rear wall portion 12 is between two and six times greater than the width $D_1$ of the front wall portion 10, and the width $D_1$ of the front wall portion 10 is approximately one-tenth of the length of L of the sensor. Accordingly, for a sensor member having a length L of 10 inches, the width $D_1$ of the front wall portion 10 would be approximately 1 inch and the width $D_2$ of the rear wall portion 12 would be between 2 and 6 inches.

In the preferred embodiment shown in FIG. 1, the horizontally convex surface of the front portion 10 comprises a semi-circle having a diameter $D_1$. Similarly, the rear wall portion 12 has a horizontally convex surface comprising a semi-circle having a diameter $D_2$. A shown in FIG. 2, the front and rear surface portions are tapered vertically inwardly, so that successive vertical horizontal cross-sections of the semi-circular surfaces of the front and rear wall portions of the sensor have incrementally decreasing diameters, respectively.

A pair of side wall portions 14, 16 are arranged between the front and rear wall portions. Each side wall portions has a concave outer surface configuration, the radius of curvature R of which is a function of the length L of the sensor member. More particularly $$R = KL$$

where $3 < K < 5$.

Like the front and rear wall portions, the side wall portions are tapered vertically inwardly, whereby the sensor member 2 has a curved, streamlined surface configuration as will be discussed in greater detail below.

The front, rear, and side wall portions terminate with a slight curvature at a top wall portion 18 arranged generally parallel to the bottom wall 8 as shown in FIG. 2. In an alternate configuration shown in the embodiment of FIG. 4, the top wall portion 118 is arranged at an angle $\alpha$ relative to the bottom wall 106. The angle $\Omega$ diverges from the front wall portion 110 of the sensor toward the rear wall portion 112 thereof, whereby the height of the sensor member increases in the direction of the rear wall portion. The angle $\alpha$ may be between 2° and 10° and is preferably 5°.

Referring once again to FIGS. 1 and 2, at least one of the side wall portions contains a horizontal pressure port or opening 20 adjacent the bottom wall 8 of the sensor member 2. The opening extends into the interior of the sensor member along a line normal to a tangent at the portion of the side wall surface containing the opening for communication with the pressure transducer 4.

The pressure port 20 is preferably located at the midpoint of the arc defined by the side wall surface between the front wall portion 10 and the rear wall portion 12. Thus in FIG. 1, the pressure port is located midway along the arc defined between points A and B adjacent the bottom wall of the sensor.

Alternatively, the pressure port 20 may be located within a limited range on either side of the midpoint of the side wall surface arc, thus making the sensor insensitive to both placement and manufacturing tolerances.

The sensor 2 is arranged on the bottom of the channel with the front wall portion 10 facing the upstream direction relative to fluid flow as shown in FIG. 2. Owing to the unique wedge-shaped curvature of the surface of the sensor, fluid passes smoothly across the pressure port with little or no disturbance, regardless of the velocity thereof. Accordingly, the velocity vector $\overline{V}$ of fluid flowing past the port is perpendicular to the direction of extension of the port, whereby fluctuations in fluid pressure at the port owing to the moving fluid are eliminated. Thus the pressure readings obtained from the pressure transducer and used to calculate the fluid level are insensitive to flow characteristics. Moreover, the streamlined configuration of the sensor prevents debris within the fluid from accumulating thereon, whereby clean undisturbed pressure readings are obtained by the transducer.

Figure 4:
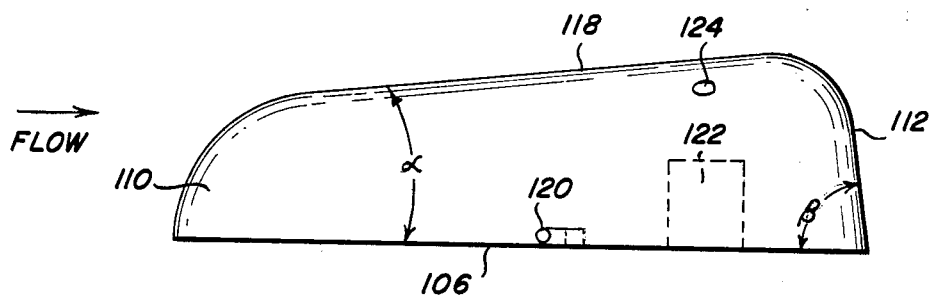
FIG. 4 is a side plan view of the sensor of FIG. 3.

In the embodiment of FIGS. 3 and 4, the rear wall portion 112 of the sensor 102 is tapered at an angle $\beta$ less than 90° relative to the bottom wall 108, with the front 110, side 114, 116, and top 118 wall portions being similarly configured to those of the sensor of FIGS. 1 and 2. A pressure port 120 contained within at least one side wall portion affords communication with a pressure transducer 104. The sensor 102 of FIGS. 3 and 4 affords the same fluid flow characteristics as the sensor of FIGS. 1 and 2.

Figure 5:
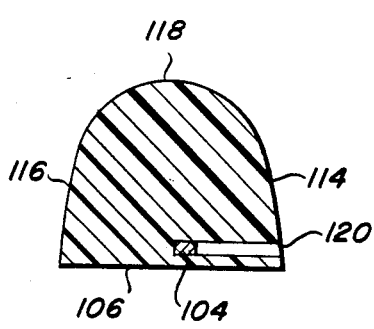
FIGS. 5 and 6 are sectional views of the sensor of FIG. 3 taken along lines 5—5 and 6—6, respectively.

Referring now to FIG. 5, the sensor member is illustrated as a solid member formed of synthetic plastic material. Alternatively, the member could be formed of any light-weight, durable, inexpensive material which is resistant to corrosion. Furthermore, the sensor member could comprise a hollow shell having an outer surface configuration corresponding to that shown in the drawing.

Figure 6:
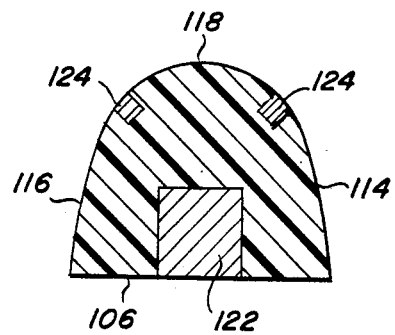

As is also shown in FIGS. 3, 4, and 6, the sensor may include an electromagnet 122 having a pair of poles (not shown) for generating in the fluid an electromagnetic field, the axis of which extends normal to the direction of fluid flow. A pair of electrodes 124 are recessively mounted in the top wall surface 118 for producing electrical signals in response to the flow of fluid through the electromagnetic field, the signals being a function of the velocity of the fluid flow. Thus the pressure level sensor may also be used as a flow meter.

It will be understood by those skilled in the art that electrical leads are normally provided from the pressure transducer, the electromagnet and the electrodes. These leads and the appropriate flow calculation equipment have been omitted from the drawing for clarity.

While in accordance with the provisions of the Patent Statute the preferred forms and embodiments of the invention have been illustrated and described, it will be apparent to those skilled in the art that various changes and modifications may be made without deviating from the inventive concepts set forth above.

What is claimed is:

1. Apparatus for mounting a pressure transducer in a fluid flow channel to measure the depth of the fluid, comprising an elongated wedge-shaped sensor member including (a) a generally planar bottom wall adapted for placement on the bottom of a channel;

(b) front and rear wall portions connected with said bottom wall, said front wall portion having a horizontally convex surface configuration and a width less than the width of said rear wall portion, said rear wall portion having a width less than the length of said sensor member;

(c) a pair of side wall portions arranged between said front and rear wall portions, each side wall portion having a horizontally concave surface configuration, the radius of curvature of said convex side wall portions being a function of the length of said sensor member; and (d) a top wall portion arranged between said front, rear and side wall portions; and (e) at least one of said side wall portions containing a horizontal opening adjacent said bottom wall for communication with the pressure transducer arranged within the sensor member, whereby when the sensor member is arranged on the bottom of a channel with the front wall portion facing the upstream direction of fluid flow, the velocity vector of the fluid flow is perpendicular to the direction of extension of said opening, thereby to minimize flow velocity effects on the pressure transducer.

2. Apparatus as defined in claim 1, wherein said opening is arranged midway between said front and rear wall portions.

3. Apparatus as defined in claim 2, wherein the radius of curvature of each of said side wall surface portions is between three and five times the length of said sensor member.

4. Apparatus as defined in claim 3, wherein the width of said rear wall portion is between two and six times the width of said front wall portion.

5. Apparatus as defined in claim 4, wherein the width of said front wall portion is generally one-tenth of the length of said sensor member.

6. Apparatus as defined in claim 5, wherein said horizontal opening extends normal to said side wall surface.

7. Apparatus as defined in claim 1, wherein said front, rear and side wall portions are tapered inwardly in the direction from said bottom wall toward said top wall portion, thereby to provide said sensor memer with a curved streamlined configuration to prevent the accumulation of debris on said sensor member.

8. Apparatus as defined in claim 7, wherein said rear wall portion has a horizontally convex surface.

9. Apparatus as defined in claim 1, wherein said sensor member further includes (f) electromagnetic means having a pair of poles for generating in the fluid an electromagnetic field the axis of which extends normal to the direction of the flow; and (g) electrode means mounted in said top wall portion for producing electrical signals in response to the flow of fluid through said electromagnetic field, said electrical signals being a function of the velocity of the fluid flow.

10. Apparatus as defined in claim 9, wherein said top wall portion is arranged at an angle relative to said bottom wall, whereby the height of said sensor member increases linearly from said front wall portion toward said rear wall portion.

11. Apparatus as defined in claim 10, wherein said angle defined between said top wall portion and said planar bottom wall is between 2° and 10°.

12. Apparatus as defined in claim 11, wherein said angle defined between said top wall portion and said planar bottom wall is 5°.

* * * * *